Oct. 28, 1952  C. WENDELKEN  2,615,507
CIRCUMFERENTIALLY TRAVELING TYPE TIRE REMOVING TOOL
Filed May 17, 1950  2 SHEETS—SHEET 1

C. Wendelken
INVENTOR
BY [signature]
ATTORNEYS.

Oct. 28, 1952 — C. WENDELKEN — 2,615,507
CIRCUMFERENTIALLY TRAVELING TYPE TIRE REMOVING TOOL
Filed May 17, 1950 — 2 SHEETS—SHEET 2

C. Wendelken
INVENTOR

Patented Oct. 28, 1952

2,615,507

UNITED STATES PATENT OFFICE 2,615,507

CIRCUMFERENTIALLY TRAVELING TYPE TIRE REMOVING TOOL

Charles Wendelken, Austin, Tex.

Application May 17, 1950, Serial No. 162,486

2 Claims. (Cl. 157—1.22)

This invention relates to a tool designed for use in separating tire beads of automobile tires from the bead beds of the wheels on which they are positioned and to which the tires frequently become secured.

An important object of the invention is to provide a tool of this character which will insure the complete insertion of the pressure foot of the tool, between the tire bead and flange of the wheel rim, and the retention of said pressure foot in this position, until the completion of the pressure stroke, thereby preventing slippage of the pressure foot.

Another object of the invention is to provide a tool of this character including a roller for contact with the edge of the center wheel hub opening, which is so constructed and arranged that the roller may be used to compensate for the variation of the distance from the edge of the wheel opening to the wheel flange which is approximately one-half of an inch longer on the inner side of the automobile wheel than at the outer side thereof, thus providing two distances or lengths for the effective operation of the tool at both sides of the wheel.

Another object of the invention is to provide a roller for engaging the edge of the center wheel hub opening to permit of free lateral radial action by the operation of lever 16 when it is desired to use the tool in stripping the tire from the rim, after completing the depression stroke.

Still another object of the invention is to provide a pressure foot of a construction to move between the tire bead and bead bed of the wheel to separate the tire from the wheel when pressure is brought to bear on the pressure foot.

With the foregoing and other objects in view which will appear as the description proceeds, the invention consists of certain novel details of construction and combinations of parts, hereinafter more fully described and pointed out in the claims, it being understood that changes may be made in the construction and arrangement of parts without departing from the spirit of the invention as claimed.

Referring to the drawing.

Figure 1:
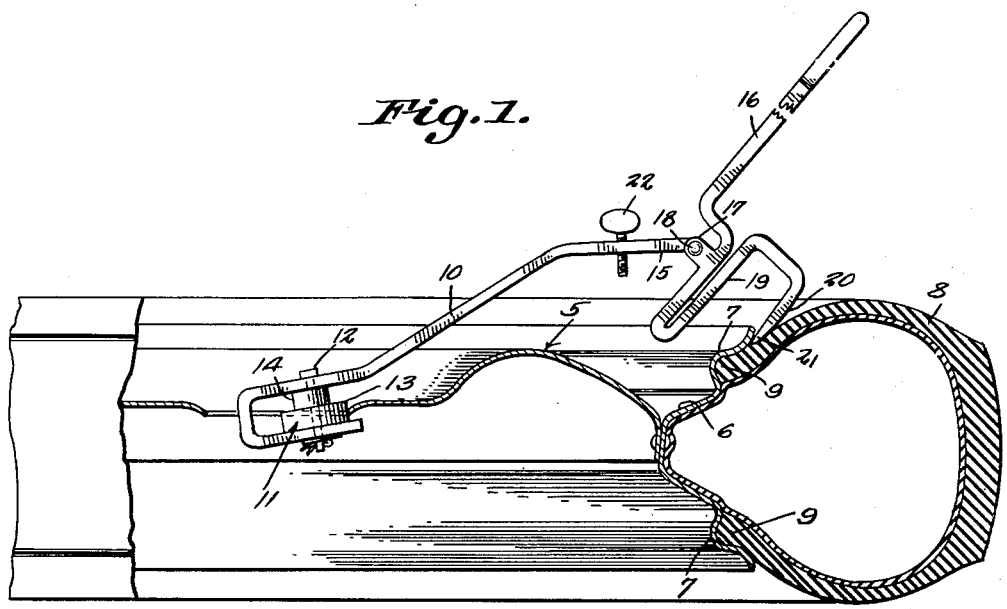
Figure 1 is a fragmental sectional view illustrating the tool as used at one side of a wheel.
Figure 2:
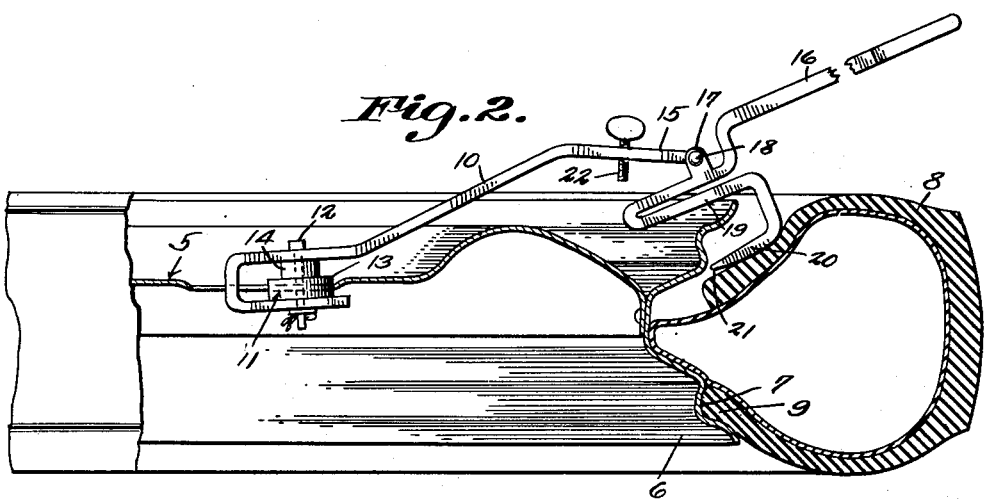
Fig. 2 is a fragmental sectional view illustrating the tool as operated to force the tire bead from the bead bed of the wheel rim.
Figure 3:
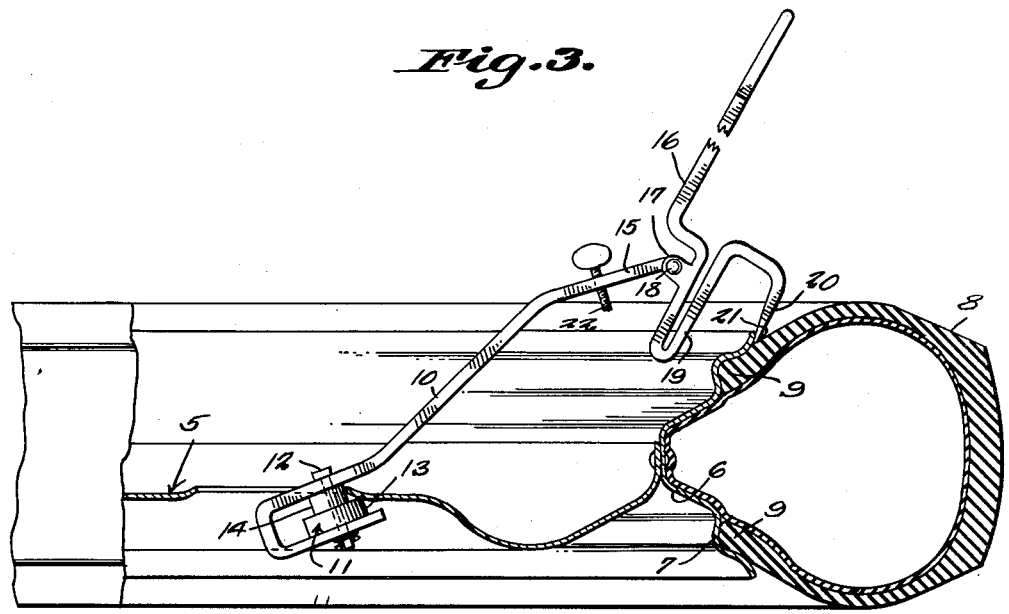
Fig. 3 is a fragmental sectional view illustrating the tool as applied to the opposite side of the wheel.
Figures 4, 5:
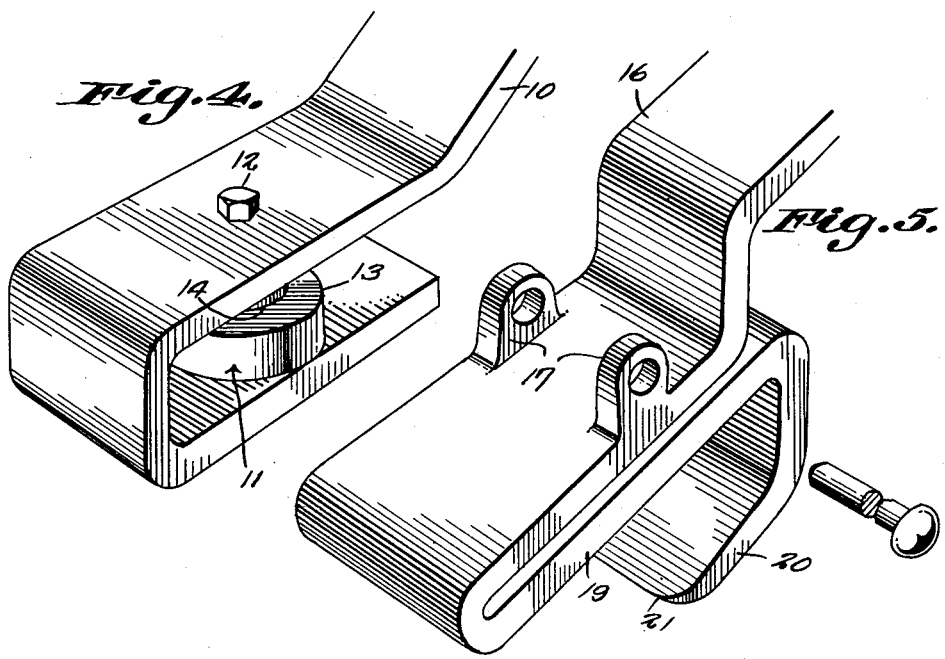
Fig. 4 is a fragmental perspective view illustrating the roller end of the tool with the roller positioned therein.
Fig. 5 is a perspective view of the presser foot of the tool.

Referring to the drawings in detail, the reference character 5 indicates a motor vehicle wheel, which is provided with the usual rim 6 having the bead bed 7.

The reference character 8 indicates the tire which is positioned on the rim 6, the tire having the usual bead 9, which is fitted in the bead bed 7, and which after considerable use, usually adheres to the bead bed, and can only be separated therefrom with difficulty, which frequently results in damage to the tire.

The tool forming the subject matter of the present invention, embodies the anchor fulcrum lever 10, which has one end thereof bent upon itself, providing a space in which the roller 11 is mounted, the roller 11 operating on the bolt 12.

This roller is of a construction providing a large diameter 13 and a substantially small diameter 14, so that the difference in diameters of the roller section will compensate for the difference in the distance between the outer edge of the usual central wheel opening, and the outer edge of the rim, at opposite sides of the wheel.

The anchor fulcrum lever 10 is provided with an offset end portion 15, to which the main lever 16 is pivotally connected, the main lever having upstanding ears 17, between which the offset end portion 15 is pivotally connected as by means of the bolt 18. One end of the main lever 16 is extended rearwardly at 19 and then forwardly as at 20, providing the pressure foot, the free edge of the forwardly extended portion 20 being beveled as at 21 to wedge between the tire bead and bead bed of the wheel to separate the tire from the wheel.

The reference character 22 indicates a set screw which is seated in a threaded opening formed in the lever 10, the set screw being adjustable so that it will provide a stop for engagement with the lever 16 at a point directly over the pressure foot, restricting movement of the lever 16, to permit the device to be effectively used in dislodging tires of various sizes, from their wheels.

In the operation of the tool, when the tire is to be removed from the rim, the tool is positioned in a manner as shown by Fig. 1 of the drawings. Downward pressure on the lever 16 will operate to move the wide pressure foot 20 between the tire and rim, further pressure on lever 16 causing the tire to be forced away from the rim and into the wall of the rim, since the portion of the lever above member 19 is contacting with the screw, shifting the fulcrum of the lever to the roller end of the lever 19. The tool is now positioned at the opposite side of the wheel and the small diameter of the roller moved against the edge of the central opening of the wheel to compensate for the additional length of this side of the wheel, between the central opening of the wheel and rim edge.

The lever 16 is now forced downwardly, with the result that the pressure foot will move between the tire and rim separating the tire from the rim at this side of the wheel.

After the tire has been separated from its rim, the tire may be readily removed by the use of the usual tire irons, without the danger of damaging the tire or rim.

Having thus described the invention, what is claimed is:

1. A tool for removing tires from rims, comprising a fulcrum lever, a roller mounted at one end of said lever, said roller having multiple varying diameters, either of said roller diameters adapted to move over the wall of the central opening of the wheel with which the tool is used, a main lever pivotally connected intermediate its ends to the other end of said fulcrum lever, a pressure foot formed at one end of the main lever, and said pressure foot adapted to move between the wheel and tire when said main lever is operated in one direction, separating the tire from the rim.

2. A tool for removing tires from rims comprising a fulcrum lever, a roller mounted at one end of said fulcrum lever, said roller having multiple diameters and adapted to move over the wall of the central opening of a wheel with which the tool is used, providing a bearing for the tool, a main lever pivotally connected with the end of the fulcrum lever opposite to the roller at a point intermediate the ends of the main lever, an extension forming a part of the main lever projecting inwardly underneath the fulcrum lever when in operative position, a pressure foot forming a part of the main lever, said pressure foot being wedge-shaped and insertible between the rim and tire being dismounted, when said main lever is moved in one direction, and a set screw carried by the fulcrum lever directly above the inwardly projecting extension and engaged by the main lever, restricting pivotal movement of the main lever with respect to the fulcrum lever, when said main lever is operated in one direction.

CHARLES WENDELKEN.

REFERENCES CITED

The following references are of record in the file of this patent:

UNITED STATES PATENTS

| Number | Name | Date |
|---|---|---|
| 1,208,184 | Mayer | Dec. 12, 1916 |
| 1,938,940 | Smith | Dec. 12, 1933 |
| 2,471,642 | Moltz | May 31, 1949 |
| 2,489,088 | Hewitt | Nov. 22, 1949 |
| 2,501,225 | Kuhlmann | Mar. 21, 1950 |